United States Patent Office 3,534,121
Patented Oct. 13, 1970

3,534,121
ORGANOTIN COMPOSITION AND RESINS STABILIZED THEREWITH
Heinz Eggensperger, Gadernheim, uber Bensheim, Holger Andreas, Bensheim-Auerbach, Volker Franzen, Heidelberg, and Günther Neubert, Reichenbach, uber Bensheim, Germany, assignors to Deutsche Advance Produktion G.m.b.H., Lautern, Odenwald, Germany
No Drawing. Filed May 22, 1967, Ser. No. 640,345
Claims priority, application Germany, May 24, 1966,
D 50,182
Int. Cl. C08f 45/62
U.S. Cl. 260—880       6 Claims

ABSTRACT OF THE DISCLOSURE

A mixture of a polymeric alkylstannoic acid with a dialkyltin mercapto compound is used as stabilizer for halogen-containing resins.

---

This invention relates to stabilizer mixtures for halogen-containing polymers and to the preparation of polymeric monoalkyltin compounds used in such mixtures.

It is well known that halogen-containing resins in which the halogen is directly bound to C atoms of the polymer chain, such as vinyl halide and vinylidene halide resins, particularly polyvinyl chloride and copolymers thereof, are discolored and decomposed under the influence of light and heat. Therefore, stabilizers are added to such resins to improve their light and heat stability. Particularly important stabilizers are the organotin compounds, especially the dialkyltin mercapto compounds and their derivatives, which allow the production of glass clear finished products.

Said stabilizers, however, have the disadvantage of reducing the impact strength of the products. In the processing and application of the synthetic resins, their impact strength assumes a steadily increasing importance; in spite of the admixture of polyethylene, polymethyl methacrylate, and ABS resins, which increase the impact strength of the halogen-containing resins to a certain extent, the tendency has been to keep the addition of light and heat stabilizers to a minimum.

We have found that the stabilizing effect of the dialkyltin mercapto compounds is considerably increased when they are employed in combination with polymeric monoalkyltin compounds which are obtained by the reaction of polymeric alkyl stannoic acids of the general formula $$(RSnO_{1.5})_n$$

wherein $n$ is an integer from 2 to 30, with less than the stoichiometric amount, calculated on the number of oxygen atoms, of an acid compound of the general formula

HA wherein A is the radical —SR$_2$ and/or —OOCR$_3$.

In these formulae, R is alkyl having 1 to 18 C atoms, and R$_2$ and R$_3$ are linear, branched, saturated or unsaturated aliphatic, alicyclic or aromatic hydrocarbon groups having 1 to 20 C atoms, which may contain substitutions of functional groups, e.g., ester, ether, or thioether groups.

The dialkyltin mercapto compounds generally used as stabilizers are those obtained by the reaction of a reactive dialkyltin compound, e.g., dialkyltin oxides or halides, with a mercapto compound.

Additional reaction components may be carboxylic acids (e.g. acetic acid, stearic acid, 2-ethylhexoic acid, maleic acid, monobutylester) or alcohols (e.g. 2-ethylhexanol, stearyl alcohol). The dialkyltin mercapto compounds have the general formula (I) 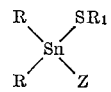

wherein R are again the same or different alkyl groups having 1 to 18 C atoms.

R$_1$ is a monovalent hydrocarbon, preferably an alkyl group having 1 to 18 C atoms which may contain substitutions of functional groups, preferably ester, ether, or thioether groups, and Z is a member of the group consisting of —SR$_1$, —OOCR$_2$ and —OR$_3$ wherein R$_1$, R$_2$, and R$_3$ have the same significance as above.

When said polymeric monoalkyltin compounds are added to the dialkyltin mercapto compounds in an amount of about 0.5 to 30 percent by weight, calculated on said dialkyltin mercapto compounds, the mixture has a stabilizing effect which goes far beyond the sum of the two components. The synergistic effect attained with said mixtures makes it possible to reduce the amount of stabilizer, which, calculated on the resin, is normally about 2 percent by weight, to about 1 to 0.1 percent, i.e. by at least 50 percent. Numerous compounding problems have been due to the fact that the stabilizer content of the resin should not exceed 1 percent by weight, e.g., in order to reduce the unpleasant smell of the organotin mercapto stabilizers or to maintain the desired impact strength required for the manufacture of polyvinyl chloride containers. These problems are solved or eliminated by means of the stabilizer mixture of the invention.

The stabilizing mixtures of the invention can be used in all resins for which organotin mercapto esters have been used as stabilizers. Such resins are, e.g., polyvinyl chloride obtained by suspension or emulsion polymerization (S—PVC and E—PVC) as well as copolymers of vinyl chloride with other ethylenically unsaturated compounds such as vinyl acetate, styrene, acrylic compounds, and after-chlorinated polyethylene resins.

Mercapto compounds suitable for the reaction with the polymeric monoalkyl stannoic acids are mercaptans, mercapto acids, mercapto acid esters; representative members of these groups are, e.g., thioglycolic acid isooctyl ester, thiophenol, thiobenzoic acid, lauryl mercaptan, β-mercapto butyric acid isooctyl ester; as acids, the same may be used as recited above for the reaction with the dialkyltin compounds.

A suitable procedure for the preparation of the polymeric monoalkyltin compounds is as follows:

A monoalkyltin trichloride $RSnCl_3$ is converted in water or in a water-acetone mixture at 60–90° C. with sodium carbonate or the stoichiometric amount of an alkali metal hydroxide with vigorous stirring to the respective stannoic acid. The acid is washed with water until it is free of chlorine and neutral, and then dried at reduced pressure at 100 to 150° C. until its weight is constant.

The thus obtained polymeric monoalkyl stannoic acid is suspended in an inert organic solvent which is immiscible with water, e.g., toluene or xylene. At room temperature, a mercapto compound HSR and/or a carboxylic acid $HOOCR_3$ is added in less than the equivalent molar amounts, the reaction is conducted under a pressure of 10–800 mm. Hg at a temperature of 10–150° C. and preferably the reaction mixture is heated under a pressure of 10 to 30 mm. Hg slowly to about 80 to 100° C. whereby the solvent distills off with the water formed in the reaction. Depending on the nature of the substituents of R, $R_2$, and $R_3$, the obtained polymeric monoalkyltin compounds are solid or liquid substances which are readily soluble in all liquid dialkyltin mercapto stabilizers of formula (I). The complicated structure of said new compounds can be represented by the formula (II) $[(RSnO_{1.5})_n]_x \cdot [RSn(A)O]_y \cdot [RSn(A)_2O_{0.5}]_z$ wherein R, A and $n$ have the same meaning as above and $x$, $y$, and $z$ are integers from 1 to 20 whereby $y$ or $z$ may also be zero. $y:x$ is preferably in the range of 6:1 to 1:1.

The following examples illustrate the invention.

EXAMPLE 1

Preparation of polymeric monoalkyltin compounds.

282.2 g. (1 mole) of monobutyltin trichloride are heated to 90° C., and an aqueous solution of 170 g. (1.6 moles) of sodium carbonate is added with stirring. After cooling to room temperature, the reaction mixture is filtered, the precipitate is washed with water to neutral and dried in vacuo at 100° C. to constant weight.

100 g. (0.5 mole) of the obtained butyl stannoic acid are reacted with 205 g. (1 mole) of thioglycolic acid in toluene with continuous removal of water. After the water and solvent has been distilled off, and after filtration, an oily liquid is obtained which is readily miscible with all known organotin stabilizers.

Sn calcd. 20.0%, found 19.8%.

All the compounds listed in the following Table I have been prepared in an analogous manner.

TABLE I

| $(RSnO_{1.5})_n$ | Starting materials $R_2SH$ or $R_3COOH$ | Percent Sn Calcd. | Percent Sn Found | Reaction products, physical condition | |
| --- | --- | --- | --- | --- | --- |
| 1 mole $(CH_3SnO_{1.5})_n$ | 1.2 moles thioglycolic acid isooctylester | 31.0 | 39.5 | Oily colorless liquid | I |
| 1 mole $(C_4H_9SnO_{1.5})_n$ | 2.0 moles thioglycolic acid isooctyl ester | 20.0 | 19.8 | ____do____ | II |
| Do | 2.2 moles acetic acid | 38.0 | 37.2 | M.P. 140–169° C. | III |
| Do | 2.0 moles 2-ethylhexoic acid | 21.0 | 19.3 | Oily colorless liquid | IV |
| Do | 2.5 moles prerun fatty acid ($C_7$–$C_9$, acid number 370–410) | 22.1 | 21.0 | Yellow oil | V |
| Do | 1.5 moles stearic acid | 19.4 | 18.7 | Fatty solid substance, M.P.=45° C. | VI |
| Do | 1.0 mole p-toluic acid | 36.3 | 35.0 | M.P. 290–291° C. | VII |
| Do | 1.8 moles thiophenol | 30.0 | 29.0 | Yellow oil | VIII |
| Do | 1.5 moles thiobenzoic acid | 30.2 | 29.5 | Brown resin | IX |
| Do | 2.5 moles maleic acid monobutyl ester | 20.2 | 19.7 | Yellow oil | X |
| Do | 1.0 mole thioglycolic acid isooctyl ester, 1.0 mole lauric acid | 20.8 | 19.5 | ____do____ | XI |
| 1 mole $(C_8H_{17}SnO_{1.5})_n$ | 2.8 moles β-mercaptopropionic acid isooctyl ester | 14.1 | 13.9 | Colorless liquid | XII |
| Do | 2.2 moles lauryl mercaptan | 18.2 | 17.4 | ____do____ | XIII |
| 1 mole $(C_{12}H_{25}SnO_{1.5})_n$ | 2.5 moles lauric acid | 15.4 | 14.6 | Solid waxy, M.P. 50–70° C. | XIV |
| 1 mole $(C_{18}H_{37}SnO_{1.5})_n$ | 2.0 moles β-mercapto isobutyric acid isooctylester | 14.4 | 14.1 | Yellow oil | XV |

EXAMPLE 2

Table II compares the stabilizing effect of stabilizer mixtures according to the invention with the best commercially available organotin mercapto stabilizers (stabilizers 1, 2a, 3b, 4c) as well as with mixed condensation products of monalkyl stannoic acid and monoalkyl thiostannoic acid (17 and 18) which have been used in the range of only 0.05 to 0.5 percent by weight, calculated on the resin.

The blends 1–28 were prepared in the same way by milling at 165° C. within 5 minutes to films of 1.1 mm. thickness which were then pressed at 180° C. at 200 atm. for 1 minute to films of 18.5 cm. length, 9 cm. width, and 1 mm. thickness.

Then said blends were sheeted out on a laboratory roll at 180° C. for 5 minutes at 0.3 mm. thickness; strips of said sheets were stored in a drying cabinet adjusted to 180° C., removed after 30, 45, 60 and 75 minutes heating and observed for discoloration.

All films which had been prepared from blends containing only dialkyltin mercapto stabilizers and not also polymeric monoalkyltin compounds I–XV, (mixtures 1–6, 9–11, 21, 24, 27) were discolored already after a storage of 30 minutes while such discoloration started only after 60 minutes in the mixtures 7, 8, 12–16, 19, 20, 22, 23, 25, 26 and 28.

The table shows that the stabilizers of the invention in amounts of less than 1 percent are superior to all known organotin mercapto stabilizers.

TABLE II

| 100 parts PVC | Stabilizer | Polymeric monoalkyltin compound No. | Epoxide | Mixture No. | Color of sample |
|---|---|---|---|---|---|
| S-PVC K-value 65 | 0.7 part dibutyltin bis(thioglycolic acid iso octylester). | | 0.3 part epoxy soybean oil. | 1 | Yellow to brown. |
| Do | 0.7 part cocondensation products of 1 mole DBTO, 2.7 moles thioglycolic acid isooctyl ester and 0.3 mole of caprylic acid. | | do | 2a | Do. |
| Do | 0.7 part mixed condensation product of butylstannoic acid and butylthiostannoic acid in the ratio of 2:1. | | do | 3b | Do. |
| Do | 0.7 parts dimeric dibutyltin bis thioglycolic acid isooctylester. | | do | 4c | Do. |
| Do | | 0.7 part I | do | 5 | Yellow. |
| Do | | 0.7 part V | do | 6 | Do. |
| Do | 0.6 part dibutyltin bis(thioglycolic acid isooctyl ester). | 0.1 part I | do | 7 | Colorless. |
| Do | do | 0.1 part V | do | 8 | Do. |
| Do | 0.9 part dimethyltin bis(thioglycolic acid isooctyl ester). | | 0.1 part epox. soybean oil. | 9 | Yellow. |
| Do | 0.9 part diisobutyltin bis(thioglycolic acid isooctyl ester). | | do | 10 | Do. |
| Do | 0.9 part dilauryltin bis(thioglycolic acid isooctyl ester). | | 0.1 part epox. oleic acid butyl ester. | 11 | Do. |
| Do | 0.81 part dimethyltin bis(thioglycolic acid isooctyl ester). | 0.09 part II | do | 12 | Colorless. |
| Do | 0.81 part diisobutyltin bis(thioglycolic acid isooctyl ester). | do | do | 13 | Do. |
| Do | 0.81 part dilauryltin bis(thioglycolic acid isooctyl ester). | do | do | 14 | Do. |
| Do | 0.09 part dibutyltin bis(thioglycolic acid isooctyl ester). | 0.01 part II | do | 15 | Do. |
| S-PVC K-value 55 | 0.08 part dioctyltin bis(thioglycolic acid isooctyl ester). | 0.02 part II | do | 16 | Do. |
| S-PVC K-value 65 | 0.1 part mixed condensation product of monobutylstannoic acid and monobutylthiostannoic acid (2:1). | | do | 17 | Brown. |
| S-PVC K-value 55 | 0.1 part mixed condensation product of monobutylstannoic acid and monobutylthiostannoic acid (1:2). | | do | 18 | Do. |
| S-PVC K-value 65 | 0.6 part reaction product of 1 mole of dibutyltin oxide, 1.7 moles of thioglycolic acid isooctylester, and 0.3 mole of caprylic acid. | 0.1 part II | 0.3 part epox. soybean oil. | 19 | Colorless. |
| Do | 0.6 part dibutyltin bis(thioglycolic acid isooctyl ester). | do | do | 20 | Do. |
| Copolymer of S-PVC and polyvinyl acetate (15% PVA). | 0.7 part di-n-octyltin bis(thioglycolic acid isooctyl ester). | | do | 21 | Yellow to brown. |
| Do | 0.3 part di-n-octyltin bis(thioglycolic acid isooctyl ester). | 0.1 part II | do | 22 | Colorless. |
| Do | do | 0.1 part XIV. | do | 23 | Do. |
| Afterchlorinated polyethylene (60% Cl). | As blend 2a | | do | 24 | Yellow to brown. |
| Do | 0.1 part dibutyltin bis(thioglycolic acid isooctyl ester). | 0.3 part XII | do | 25 | Colorless. |
| Do | do | 0.3 part XIII | do | 26 | Do. |
| E-PVC K-value 77 | As blend 3b | | | 27 | Do. |
| Do | 0.5 part dibutyltin bis(thioglycolic acid isooctyl ester). | 0.1 part IV | | 28 | Colorless. |

The new stabilizer mixture is of particular advantage for mixtures of polyvinyl chloride with polyolefins or acrylonitrile-styrene copolymers or ABS resins or ABS type resins in which modified components, e.g., methacrylic acid, fumaric acid esters, or methacrylates instead of acrylonitrile and/or methylstyrene instead of styrene have been used. The proportion of polyvinyl chloride in such mixtures will be, as a rule, at least 50%.

EXAMPLE 3

A mixture was prepared from 80 parts by weight of a suspension polyvinyl chloride (K value 63) and 20 parts of an ABS resin.

To 100 g. samples of said mixture, 2 g. of the stabilizers of Table III were added, and the mixtures were sheeted out by milling for 5 minutes at 180° C. to films of 0.3 mm. thickness. The films were cut into strips and stored at 180° C. in an air circulating drying cabinet from which they were removed after 15 and 90 minutes and checked for discoloration.

In addition, film samples of 1.25 g. were heated at 180° C., and the start and proportion of split off hydrochloric acid were measured by means of the electric conductivity.

TABLE III

| Stabilizer | Color after— 15 min. | Color after— 90 min. | Start of HCl development after (min.)— | Percent developed HCl after 2.5 hours |
|---|---|---|---|---|
| 2 g. dibutyltin bisthioglycolic acid isooctylester (A). | Yellow | Dark brown. | 43 | 3.2 |
| 1.8 g. (A) plus 0.2 g. of reaction product of 1 mole butylstannoic acid and 2.2 moles of thioglycolic acid isooctyl ester (B). | Colorless | Brown | 47 | 1.9 |
| 1.5 g. (A) plus 0.5 g. (B) | Colorless | Light brown. | 55 | 1.6 |

EXAMPLE 4

A mixture was prepared from 40 parts by weight of a suspension polyvinyl chloride (K value 65), 40 parts of a ABS resin, and 20 parts of dioctylphthalate.

To 100 g. samples of the blend, 2 g. of epoxidized soybean oil and the stabilizers of Table IV were added, and the blends were milled for 5 minutes at a temperature of 175° C. and sheeted out to films of a thickness of 0.5 mm. The films were cut and stored in an air drying cabinet at 190° C. Samples were taken out after 15, 60 and 90 minutes and checked for discoloration.

TABLE IV

| Stabilizer | Color after (minutes) | | |
|---|---|---|---|
| | 15 | 60 | 90 |
| 1.5 g. A | Colorless | Light yellow | Light brown. |
| 1.47 g. A, 0.03 g. B | do | Colorless | Yellow. |
| 2 g. Ba-Cd stabilizer | Yellow | Light brown | Dark brown. |

The Ba-Cd stabilizer was a commercially available stabilizer comprising a mixture of Ba and Cd salts of fatty acids, pentaerythritol, bisphenol A, and dodecylphenylphosphite.

EXAMPLE 5

A mixture was prepared from 90 parts of a suspension polyvinyl chloride (K value 55) and 10 parts of a MBS resin (a copolymer of about 30% methacrylic acid ester, about 30% of butadiene and about 40% of styrene).

The stabilizers of Table V, together with 0.3% of epoxidized soybean oil, were added to 100 g. aliquots of the blend, and the mixtures were milled for 5 minutes at 165° C. and sheeted out to films of 1.1 mm. thickness. From said films, plates of 18.5 cm. length, 9 cm. width, and 1 mm. thickness were pressed for 1 minute at 180° C. and at a pressure of 200 atm. Said plates pressed without the stabilizers were at once yellowish discolored.

TABLE V

Stabilizer:                     Color of pressed plates 0.7% cocondensation product of 1 mole of dioctyltin oxide, 1.7 moles of thioglycolic acid isooctylester, and 0.3 moles of caprylic acid _____ Yellow 0.7% of a mixed condensation product of butyl stannoic acid and butylthiostannoic acid (2:1) _____ Brown 0.7% of dioctyltin bis thioglycolic acid isooctylester _____ Yellow 0.5% of dioctyltin bis thioglycolic acid isooctylester+0.1% of the reaction product of 1 mole of $(C_8H_{17}SnO_{1.5})_n$ and 2 moles of thioglycolic acid isooctylester _____ Colorless

We claim:

1. As a synergistic organotin stabilizer mixture, a dialkyltin mercapto compound selected from the group consisting of dimethyltin bis (isooctyl thioglycolate), di-n-octyltin (isooctyl thioglycolate), diisobutyl tin bis (isooctyl thioglycolate), and dilauryltin bis (isooctyl thioglycolate) and about 0.5 to 30 percent by weight, calculated on the dialkyltin mercapto compound, of a compound prepared by reacting at 10 to 150° C. and a pressure of about 10 to 800 mm. Hg one mole of polymeric monoalkyl stannoic acid selected from the group consisting of methyl stannoic acid, butyl stannoic acid, octyl stannoic acid and dodecyl stannoic acid with 1 to 2.5 moles of reactant selected from the group consisting of isooctyl thioglycolate, 2-ethylhexoic acid, p-toluylic acid, lauryl mercaptan and lauric acid said reactant being present in an amount less than the stoichiometric amount based on the oxygen of the polymeric monoalkyl stannoic acid.

2. The stabilizer mixture of claim 1 wherein at least one hydrogen of at least one of said monovalent hydrocarbon groups is substituted by a functional group selected from the group consisting of esters, ethers, and thioethers.

3. A composition comprising a resin selected from the group consisting of polyvinyl chloride and copolymers containing at least 50 weight percent vinyl chloride with ethylenically unsaturated compounds and as stabilizer 0.1 to 5 percent by weight, calculated on the resin, of the stabilizer mixture of claim 1.

4. A composition as claimed in claim 3 wherein said resin is polyvinyl chloride.

5. The composition of claim 3 wherein said resin is a copolymer of vinyl chloride and a material selected from the group consisting of vinyl acetate, styrene, acrylic compounds and after-chlorinated polyethylene resins.

6. A composition comprising a mixture of polyvinylchloride and a material selected from the group consisting of polyolefins, acrylonitrile-styrene copolymers, and acrylonitrile-butadiene-styrene resins and as the stabilizer, 0.1 to 5 percent by weight calculated on the resin, of the stabilizer of claim 1.

References Cited

UNITED STATES PATENTS

| 2,789,102 | 4/1957 | Weinberg | 260—45.75 |
| 2,985,617 | 5/1961 | Salzer et al. | 260—45.7 |
| 3,021,302 | 2/1962 | Frey et al. | 260—45.75 |
| 3,367,997 | 2/1968 | Smith | 260—891 |
| 3,413,264 | 11/1968 | Hechenkleiker | 260—45.75 |
| 2,763,632 | 9/1956 | Johnson | 200—45.75 |
| 3,284,363 | 11/1966 | Proops | 260—18 |

DONALD E. CZAJA, Primary Examiner

V. P. HOKE, Assistant Examiner

U.S. Cl. X.R.

252—406; 260—45.75, 429.7, 881, 897